July 14, 1936.  I. P. HARING  2,047,928
INTERNAL COMBUSTION MOTOR
Filed Sept. 19, 1933   2 Sheets—Sheet 1

Inventor
Ivan P. Haring.

By Hardway Cathey
Attorneys

Patented July 14, 1936

2,047,928

UNITED STATES PATENT OFFICE 2,047,928

INTERNAL COMBUSTION MOTOR

Ivan P. Haring, Houston, Tex., assignor of two-thirds to Thomas L. Cummings, Harris County, Tex.

Application September 19, 1933, Serial No. 690,069

1 Claim. (Cl. 60—32)

This invention relates to an internal combustion motor.

An object of the invention is to provide an internal combustion motor having means for delivering charges of the motive fluid to, and for exhausting the spent gases from, the explosion chambers of the cylinders without the use of intake and exhaust valves.

Another object is to provide an internal combustion motor having suction means for scavenging the explosion chambers and inducing the intake of the explosive charges.

A further object is to provide, in an internal combustion motor, a novel type of exhaust manifold.

With the above and other objects in view, this invention has particular relation to certain novel features of construction, operation and arrangement of parts, an example of which is given in this specification and illustrated in the accompanying drawings, wherein:—

Figure 2:
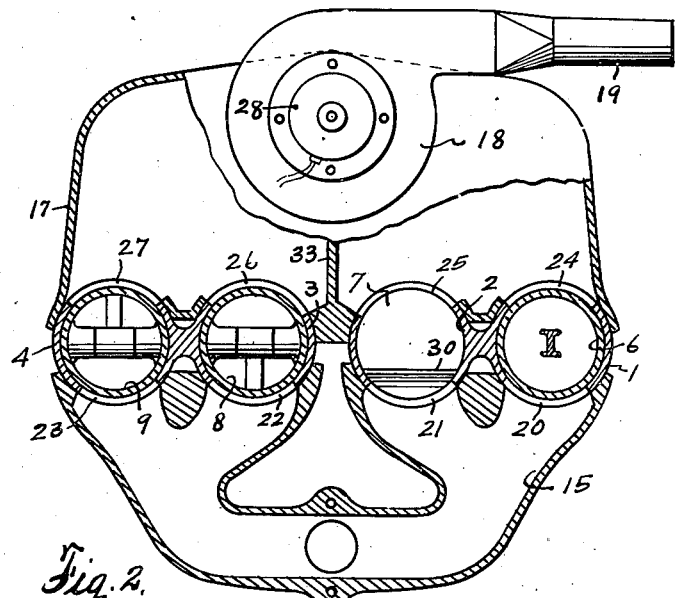
Figure 2 shows a transverse sectional view taken on the line 2—2 of Figure 1.
Figure 1:
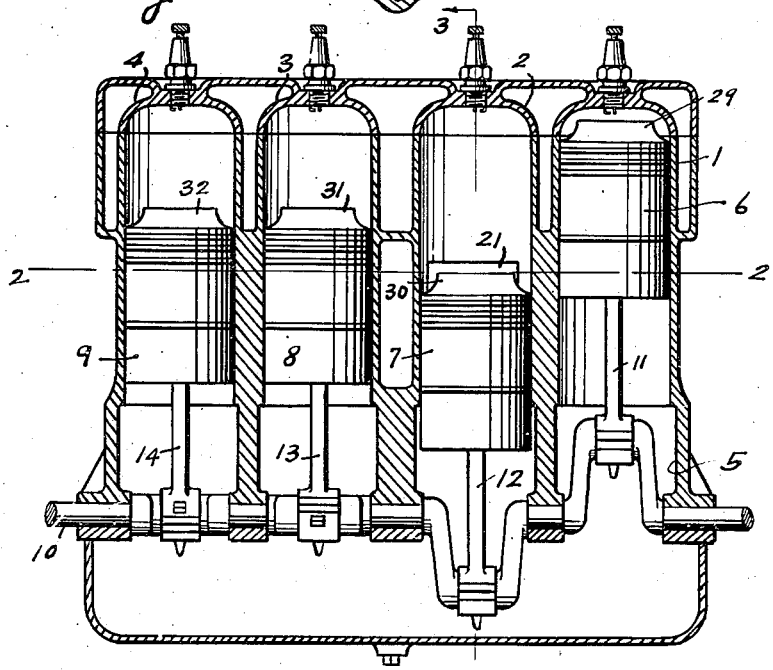
Figure 1 shows a longitudinal vertical sectional view of the motor.

In the drawings the numerals 1, 2, 3 and 4 designate, respectively, the cylinders of a 4 cylinder type of internal combustion motor which are mounted on the crank-case 5. In the cylinders the respective pistons 6, 7, 8 and 9 are mounted to reciprocate in the usual manner.

Mounted to run in longitudinally aligned bearings in the crank-case, there is the crank-shaft 10, having cranks arranged 90 degrees apart therearound and these cranks are connected to the respective pistons by means of the connecting rods 11, 12, 13, and 14. There is an intake manifold 15 equipped with the carburetor 16 and there is also an exhaust manifold 17 having a suction generator 18 mounted thereon whose casing terminates in a discharge pipe, 19.

The respective cylinders have the inlet openings 20, 21, 22 and 23, leading inwardly from the intake manifold and opposite the inlet openings have also the discharge openings 24, 25, 26 and 27 leading into the exhaust manifold, 17.

The suction generator may be driven in any suitable manner, as by an electrical motor, 28.

Figure 3:
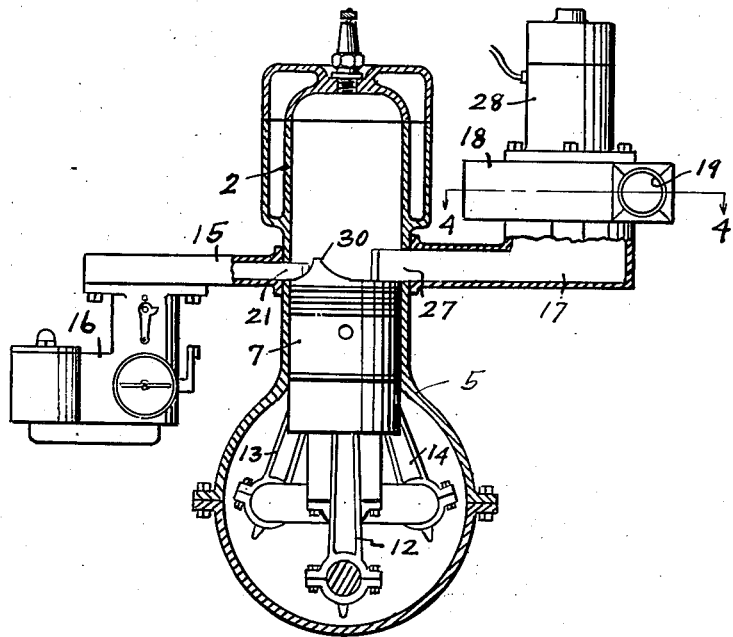
Figure 3 shows a vertical sectional view taken on the line 3—3 of Figure 1.
Figure 4:
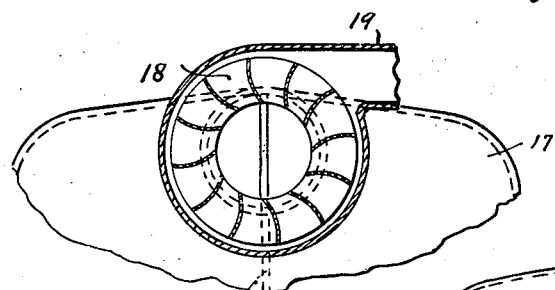
Figure 4 shows an enlarged, fragmentary, horizontal sectional view taken on the line 4—4 of Figure 3.

The suction generator creates a constant suction through the exhaust manifold, 17, and when a piston on its down stroke begins to clear an inlet opening, as the opening 21, Figure 3, a new charge of the explosive mixture will begin to enter the explosion chamber of the corresponding cylinder, as 2. It will be noted from Figure 3 that the exhaust opening of a cylinder is partly cleared or opened by the piston before the corresponding inlet opening is open so that the exhaust began to take place in advance of the inlet. It will be noted that the pistons are provided with the deflectors 29, 30, 31 and 32, arranged to deflect the inflowing motive fluid upwardly toward the cylinder heads so as to efficiently scavenge the cylinders and upon return or compression stroke of a piston, the openings thereof will be quickly closed by the piston in time to prevent the escape and waste of the motive fluid. The charge will then be compressed and fired in the usual way.

The explosions will occur in the respective cylinders 1, 3, 2 and 4 in the order stated, an explosion occurring with each quarter revolution of the crank-shaft, thus providing a two-cycle motor. The number of cylinders may be multiplied if desired.

Figure 5:
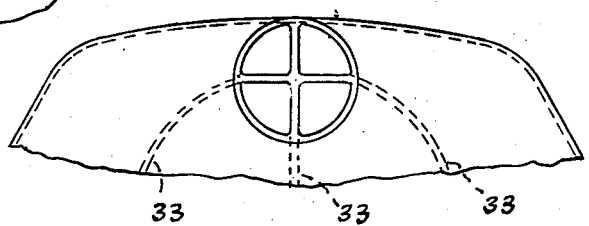
Figure 5 shows an enlarged fragmentary plan view of a type of exhaust manifold that may be employed.

The exhaust manifold has a transverse partition, 33, arranged so as to separate the cylinders in pairs. In case of an 8 cylinder motor, 3 of these partitions will be necessary, as indicated in Figure 5. This partition, or the partitions, separate the cylinders in such manner that the cylinder in which an explosion occurs will be separated by such partition from the cylinder in which the explosion is next to occur so that the flame from the exhaust will not be liable to ignite the charge of said last mentioned cylinder while the exhaust opening of said last mentioned cylinder is still open.

The drawings and description disclose what is now considered to be a preferred form of the invention by way of illustration only, while the broad principle of the invention will be defined by the appended claim.

What I claim is:

In an internal combustion motor having cylinders, each cylinder having an explosion chamber; a one piece exhaust manifold common to all the cylinders and having a suction generator thereon whose casing terminates in a discharge pipe, a partition across said manifold which continues on across the generator casing, and which is arranged to separate said explosion chambers in pairs.

IVAN P. HARING.